O. W. JONES.
Draft Device for Three Horses.
No. 111,944.
Patented Feb. 21, 1871.
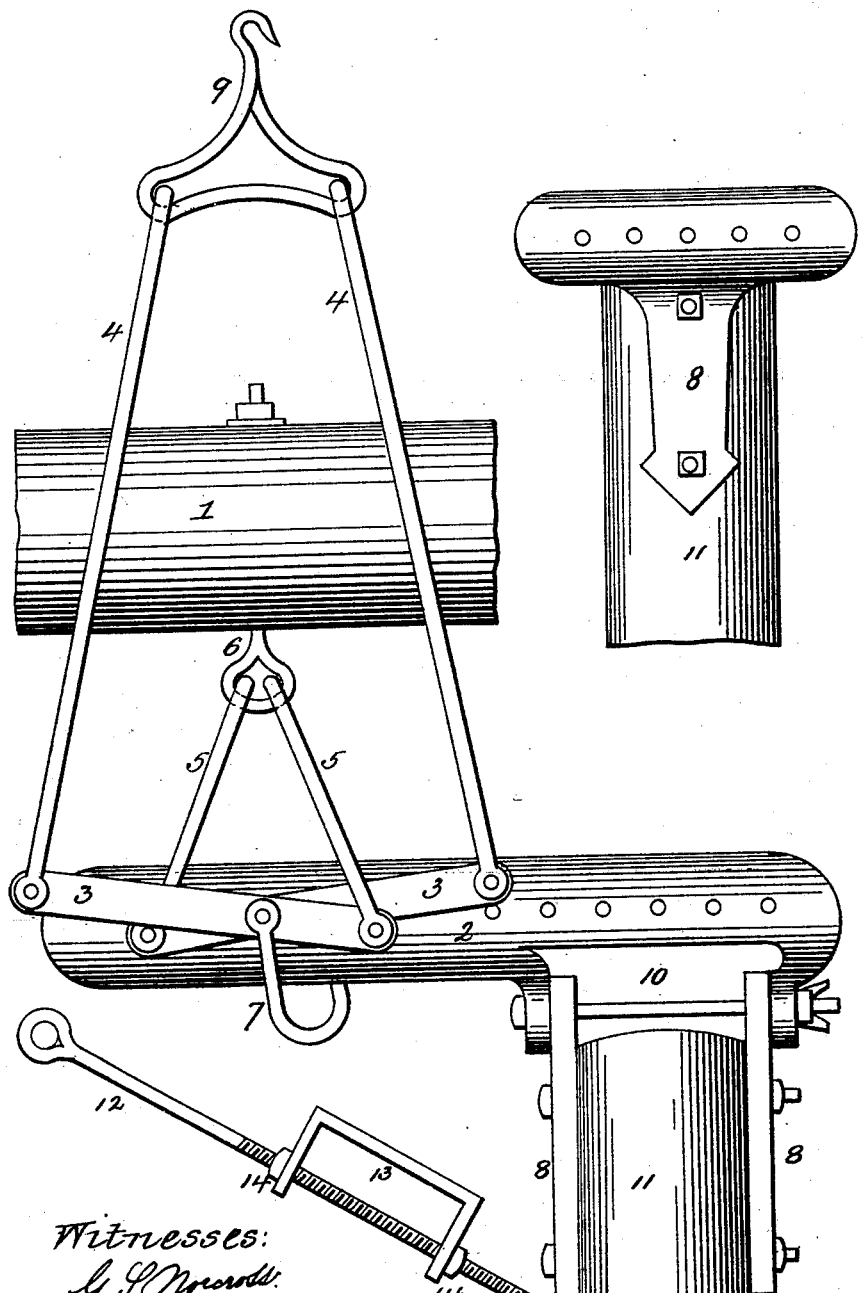

United States Patent Office.

OWEN W. JONES, OF COLUMBUS, WISCONSIN.

Letters Patent No. 111,944, dated February 21, 1871.

IMPROVEMENT IN DRAFT-DEVICES FOR THREE HORSES.

The Schedule referred to in these Letters Patent and making part of the same.

*To all whom it may concern:*

Be it known that I, OWEN W. JONES, of Columbus, in the county of Columbia, in the State of Wissin, have invented a new and Improved Mode of Draft for Three Horses; and I do hereby declare that the following is a full and exact description thereof, reference being made and had to the accompanying drawing, and to the figures of reference marked thereon.

The nature of my invention consists in equalizing the draft for three horses abreast for plowing, mowing, thrashing, or any other place where three horses may be used as above described, abreast, the outside horses to be attached to long evener No. 1, in the accompanying drawing, the center horse to be attached to No. 9 hook in drawing.

Equalizing attachment for three horses.

No. 1, evener for the two horses; length, four feet four inches.
No. 2, clevis-bar.
No. 3, equalizing-bars.
No. 4, draft-rods.
No. 5, short draft-rods.
No. 6, eye-bolt.
No. 7, clevis.
No. 8, clevis-bar ears.
No. 9, draft-hook for the center horse.
No. 10, bolt.
No. 11, plow-beam.
No. 12, drawing-rod.
No. 13, draft attachment to standard of plow.
No. 14, nuts on draft-rod.

No. 1, evener attached to No. 5, short draft-rods, by No. 6, eye-bolt.
No. 5, short draft-rods attached to No. 3, equalizing-bars.
No. 3, equalizing-bars, attached to No. 2, clevis-bar, by clevis-bolt, No. 7.
Eye of No. 12, drawing-rod, attached to No. 7, clevis.
No. 12, drawing-rod attached to No. 13, draft attachment, and held by No. 14, nuts. By nuts 14 drawing-rod can be lengthened or shortened, to accommodate length of plow-beam, the whole draft depending on rod No. 12; and relieving beam of strain, the whole draft being on standard of plow.
No. 7, clevis, can be moved to the right or left, to gauge width of the furrow, and for two or three horses.
The drawing is represented for three horses.
As is now represented, the off horse travels in the furrow, the other on land side.
Nos. 11 and 8, side drawing, represent side view of plow-beam and clevis-bar ears.
No. 2, clevis-bar, can be moved, by means of bolt No. 10 in holes of No. 8, clevis-bar ears, to gauge the depth of furrow.

What I claim as new, and desire to secure by Letters Patent, is—

The three-horse draft attachment to wagons, substantially as shown and described.

OWEN W. JONES.

Witnesses:
HARVEY ROWELL,
JNO. C. HOPPIN.